United States Patent [19]

Brackett

[11] Patent Number: 4,685,342
[45] Date of Patent: Aug. 11, 1987

[54] DEVICE FOR CONVERTING LINEAR MOTION TO ROTARY MOTION OR VICE VERSA

[76] Inventor: Douglas C. Brackett, Saccarrappa, Scarborough, Me. 04074

[21] Appl. No.: 734,454

[22] Filed: May 15, 1985

[51] Int. Cl.⁴ .......................... F02G 1/06; F16H 21/18
[52] U.S. Cl. ........................................... 74/50; 74/569
[58] Field of Search .............................. 74/49, 50, 569

[56] References Cited

U.S. PATENT DOCUMENTS

| | | |
|---|---|---|
| 231,145 | 8/1880 | Brady ...................................... 74/569 |
| 283,558 | 8/1883 | Baumgarten ............................. 74/50 |
| 389,782 | 9/1888 | Willcox .................................... 74/569 |
| 562,086 | 6/1896 | Livingstone ............................. 74/50 |
| 616,674 | 12/1898 | Hann et al. ............................. 74/569 |
| 813,736 | 2/1906 | Pendleton . |
| 829,735 | 8/1906 | Ramsey . |
| 840,668 | 1/1907 | Stocks . |
| 963,449 | 7/1910 | Loftus ...................................... 74/50 |
| 969,847 | 9/1910 | Davis . |
| 997,480 | 7/1911 | Twombly . |
| 999,220 | 8/1911 | Harmon . |
| 1,205,895 | 11/1916 | Hoyt ........................................ 74/50 |
| 1,349,660 | 8/1920 | Buhl ......................................... 74/50 |
| 1,505,856 | 8/1924 | Briggs ..................................... 74/50 |
| 1,518,438 | 12/1924 | Lindley . |
| 1,687,425 | 10/1928 | Briggs . |
| 1,798,104 | 3/1931 | Palmer .................................... 74/569 |
| 1,803,795 | 5/1931 | Finley . |
| 1,897,553 | 2/1933 | Durnan . |
| 2,366,237 | 1/1945 | Clausen . |
| 2,404,470 | 7/1946 | Zemen . |
| 2,404,651 | 7/1946 | Olin . |
| 2,404,906 | 7/1946 | Heald ....................................... 74/50 |
| 2,472,647 | 6/1949 | Covins . |
| 2,512,185 | 6/1950 | Thompson . |
| 2,513,514 | 7/1950 | Poage . |
| 2,588,666 | 3/1952 | Slemmons . |
| 2,628,602 | 2/1953 | Butterfield ........................... 123/197 |
| 2,640,363 | 6/1953 | Manley . |
| 2,660,088 | 11/1953 | Serra ...................................... 74/569 |
| 3,304,791 | 2/1967 | Geeson .................................. 74/569 |
| 3,451,276 | 6/1969 | Wadlow et al. . |
| 3,451,277 | 6/1969 | Kieronski .............................. 74/569 |
| 3,517,652 | 6/1970 | Albertson . |
| 3,677,313 | 7/1972 | Hessler ................................... 74/50 |
| 4,013,048 | 3/1977 | Reitz ............................... 123/56 BC |
| 4,054,115 | 10/1977 | Habsburg-Lothringen ........ 123/193 CP |
| 4,185,508 | 1/1980 | Hardt ...................................... 74/53 |
| 4,339,960 | 7/1982 | Senft ....................................... 74/50 |
| 4,459,945 | 7/1984 | Chatfield ........................... 123/56 C |

FOREIGN PATENT DOCUMENTS

| | | |
|---|---|---|
| 584082 | 9/1933 | Fed. Rep. of Germany . |
| 112767 | 10/1918 | United Kingdom .................... 74/50 |
| 152799 | 10/1920 | United Kingdom . |
| 533047 | 2/1941 | United Kingdom . |

Primary Examiner—George H. Krizmanich
Attorney, Agent, or Firm—Ralph W. Selitto, Jr.

[57] ABSTRACT

A device for converting linear motion to rotary motion or vice versa employs at least two bearing members mounted for rotation about a crankpin of a rotatable crank, each bearing member being in constant engagement with its own individual bearing surface. A shuttle, which is mounted for reciprocating linear movement, carries the bearing surfaces, which are located on opposite sides of the crankpin and are offset relative to each other. Because the bearing members are in constant engagement with their associated bearing surfaces, the linear motion of the shuttle is continuously converted into the rotary motion of the crank or vice versa.

29 Claims, 4 Drawing Figures

DEVICE FOR CONVERTING LINEAR MOTION TO ROTARY MOTION OR VICE VERSA

FIELD OF THE INVENTION

The present invention relates to devices for converting linear motion to rotary motion or vice versa, and, more particularly, to such devices which are especially adapted for use in connection with piston-driven machines.

BACKGROUND OF THE INVENTION

Conventional crankshaft/scotch yoke mechanisms have been used for many years to convert linear motion into rotary motion and vice versa. In such mechanisms, the reciprocating linear movement of the piston or pistons causes the rotary movement of a crankshaft by causing a crankpin-mounted roller or bearing to move back and forth along a slot formed in a single yoke extending from the piston or pistons (see, for instance, U.S. Pat. Nos. 2,404,906, 2,628,602 and 3,517,652; British Pat. Nos. 112,767, 152,799 and 533,047 and German Pat. No. 584,082). To prevent jamming of the roller or bearing, a spacing must be provided between the roller or bearing and at least one bearing surface of the slot of the yoke. Such a spacing is disadvantageous because it causes backlash (i.e., lost motion between the linear movement of the yoke/piston or pistons, on the one hand, and the rotary movement of the crankpin/crankshaft, on the other hand), which results in brinelling, spalling and/or undesired vibrations. Brinelling, spalling and/or undesired vibrations cause, in turn, wear and material fatigue and deterioration.

U.S. Pat. Nos. 963,449 and 4,339,960 disclose crankshaft/scotch yoke mechanisms which are specifically designed for use in Stirling-type engines. These mechanisms employ a single crankpin and a plurality of slotted yolks. The crankpin is provided with one or more rollers or bearings, each roller or bearing translating its motion to one or more slotted yokes. Because each roller or bearing is captured in a slot of one or more of the yokes, a spacing must be provided between the roller or bearing and at least one bearing surface of the slot or slots in order to prevent jamming. The provision of such a spacing creates the same wear, fatigue and deterioration problems discussed above.

SUMMARY OF THE INVENTION

The present invention relates to a new and improved device for converting linear motion to rotary motion or vice versa without the problems and disadvantages of the prior art devices described above. More particularly, the new and improved device includes at least two bearing members which are rotatably mounted on a crankpin of a rotatable crank. Each bearing member is in constant engagement with its own individual bearing surface, which is part of a shuttle mounted for reciprocating linear movement. The bearing surfaces are arranged on opposite sides of the crankpin such that they are offset relative to each other in a direction which is parallel to a longitudinal axis of the crankpin. Because the bearing members are in constant engagement with their associated bearing surfaces, the linear motion of the shuttle is continuously converted into the rotary motion of the crank or vice versa to thereby eliminate backlash and its accompanying wear, fatigue and deterioration problems and disadvantages.

By restricting each bearing surface to its respective side of the crankpin, each bearing member is unrestricted on one side of the crankpin. Accordingly, in direct contrast to the prior art devices discussed above, the bearing members are not constrained within slots, whereby the backlash problem associated with such prior art devices is avoided.

For use in connection with piston-driven machines, the shuttle is provided with one or more pistons, each piston being mounted for reciprocating linear movement in a corresponding cylinder. Each piston can be formed integrally with the shuttle or, alternatively, can be removably fastend to the shuttle. Similarly, the bearing surfaces can be formed integrally with the shuttle or, alternatively, can be removably fastened to the shuttle. If the bearing members and the bearing surfaces are removable, the bearing members and the bearing surfaces can be provided as separate interchangeable sets. By changing these sets, the linear speed of the shuttle relative to the angular speed of the crank can be varied.

BRIEF DESCRIPTION OF THE DRAWINGS

For a better understanding of the present invention, reference is made to the following description of various exemplary embodiments of the invention considered in conjunction with the accompanying drawings, in which:

FIG. 3b is a cross-sectional view, taken along line III—III of FIG. 3a and looking in the direction of the arrows, of the embodiment illustrated in FIG. 3a.

DESCRIPTION OF THE EXEMPLARY EMBODIMENTS

Although the present invention is applicable to many different types of machines (such as compactors, pumps, motors, punch presses, robots, sewing machines. generators, locks, engines and compressors) in which linear motion is converted to rotary motion or vice versa, it is especially suitable for use in connection with piston engines. Accordingly, the present invention will be described in connection with a piston engine.

Figure 1:
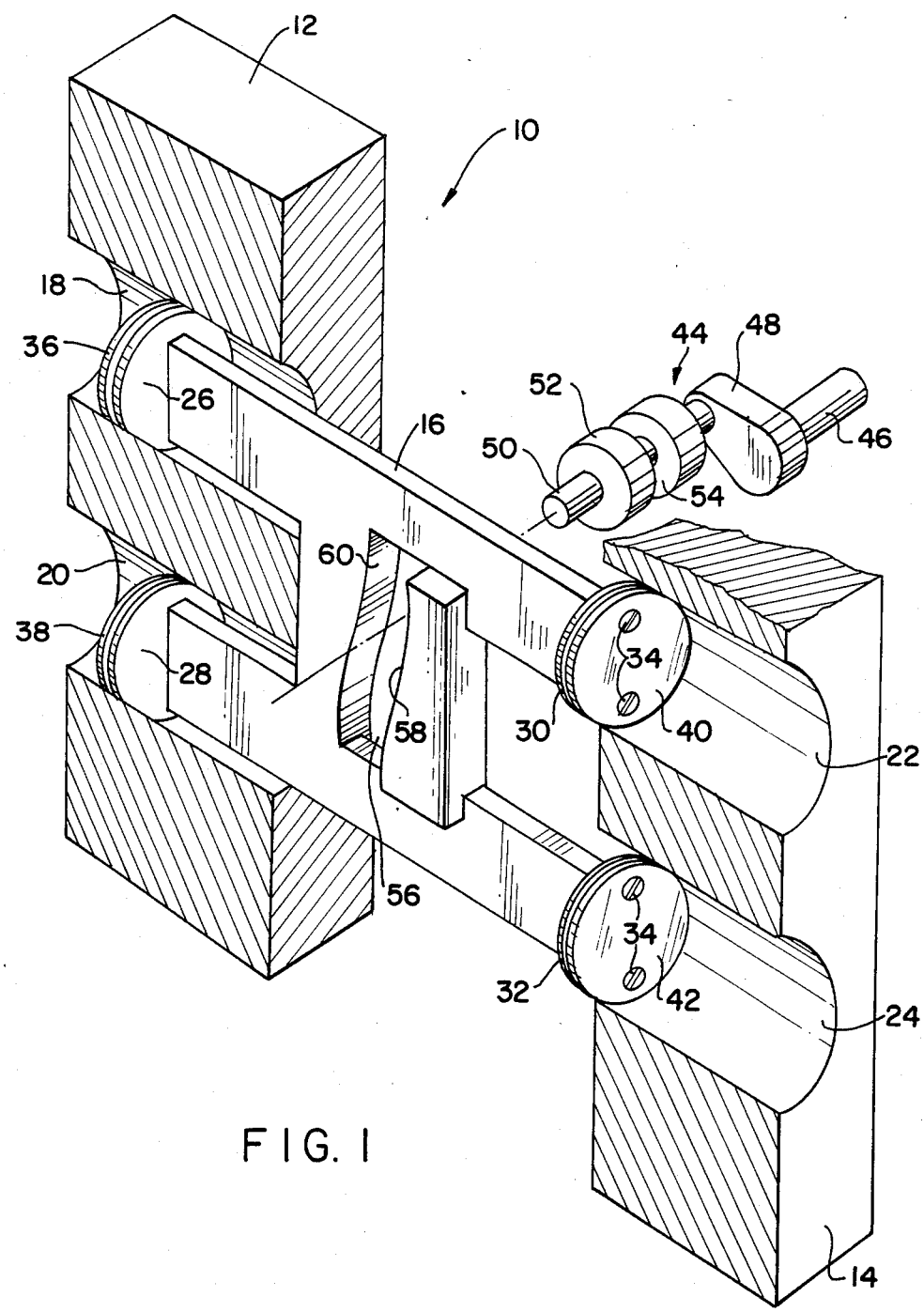
FIG. 1 is an exploded perspective view of a piston engine which incorporates one embodiment of the present invention.
Figure 2:
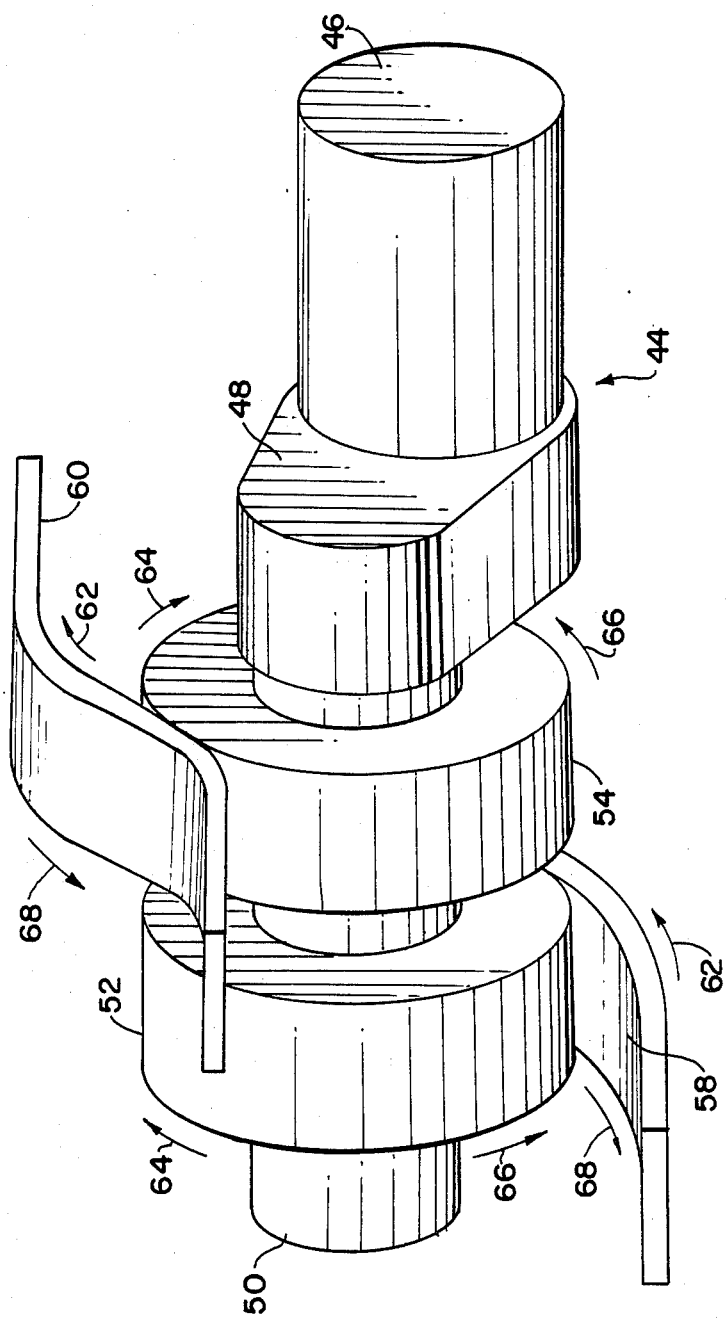
FIG. 2 is a schematic perspective view of a poriton of the embodiment illustrated in FIG. 1.

Referring to FIGS. 1 and 2, a piston engine 10 includes a pair of cylinder blocks 12, 14 and a piston shuttle 16. The cylinder block 12 is provided with a pair of cylinders 18, 20, while the cylinder block 14 is provided with a pair of cylinders 22, 24. The shuttle 16 includes a first pair of pistons 26, 28 mounted for reciprocating linear motion in the cylinders 18, 20, respectively, and a second pair of pistons 30, 32 mounted for reciprocating linear motion in the cylinders 22, 24, respectively. The pistons 26, 28, 30, 32 are fastened to the shuttle 16 by screws 34, which are threadedly received in holes (not shown) provided in faces 36, 38, 40, 42 of the pistons 26, 28, 30, 32, respectively, and extending into the shuttle 16. Because the screws 34 are located in the piston faces 36, 38, 40 42, they are accessible through the cylinders 18, 20, 22, 24 so that the pistons 26, 28, 30, 32 can be detached from the shuttle 16 without removing the shuttle 16 from the engine 10.

A crank 44 is operatively associated with the shuttle 16. More particularly, the crank 44 includes a crankshaft 46, a crankarm 48 mounted for conjoint rotation with the crankshaft 46, and a crankpin 50 mounted for conjoint rotation with the crankshaft 46, the crankpin 50 and the crankshaft 46 being offset relative to each other. Bearing members 53, 54 are rotatably mounted on the crankpin 50, which extends through an opening 56 provided in the shuttle 16 such that the bearing member 52 is in constant engagement with a bearing surface 58 located on one side of the shuttle 16 and the bearing member 54 is in constant engagement with a bearing surface 60 located on an opposite side of the shuttle 16.

In operation, as the pistons 26, 28, 30, 32 reciprocate linearly in the cylinders 18, 20, 22, 24, respectively, the bearing members 52, 54 move back and forth along the bearing surfaces 58, 60, respectively. More particularly, as the bearing members 52, 54 roll along the bearing surfaces 58, 60, respectively, in a first direction (indicated by arrows 62 in FIG. 2), the bearing member 52 rotates in one arcuate direction (indicated by arrows 64 in FIG. 2) and the bearing member 54 rotates in an opposite arcuate direction (indicated by arrows 66 in FIG. 2). As the bearing members 52, 54 roll along the bearing surfaces 58, 60, respectively, in a second direction (indicated by arrows 68 in FIG. 2), the bearing member 52 rotates in the arcuate direction indicated by the arrows 66 and the bearing member 54 rotates in the arcuate direction indicated by the arrows 64. Because the bearing members 52, 54 are in constant engagement with the bearing surfaces 58, 60, respectively, as the bearing members 52, 54 move back and forth along the bearing surfaces 58, 60, respectively, the linear motion of the shuttle 16 is continuously converted into the rotary motion of the crank 44 to thereby eliminate backlash.

In order to improve the operation of the engine 10, it may be equipped with a lubrication system (not shown) by which a thin film of oil or some other lubricant is interposed between the bearing members 52, 54 and the bearing surfaces 58, 60, respectively. Despite the provision of such an oil film, the bearing members 52, 54 are still, for all intents and purposes, in constant engagement with the bearing surfaces 58, 60, respectively.

The pistons 26, 28, 30, 32 cooperate with the cylinders 18, 20, 22, 24 to guide the shuttle 16 during its reciprocating linear movement. If the shuttle 16 were pistonless, other means could be provided in order to guide the shuttle 16.

Figure 3A:
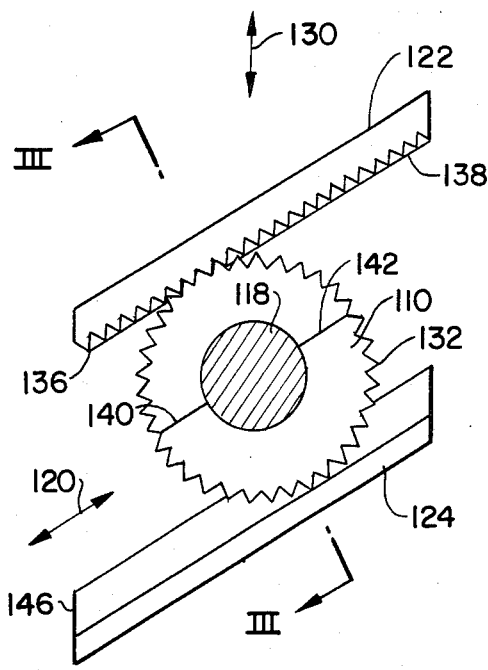
FIG. 3a is a schematic elevational view of another embodiment of the present invention.
Figure 3B:
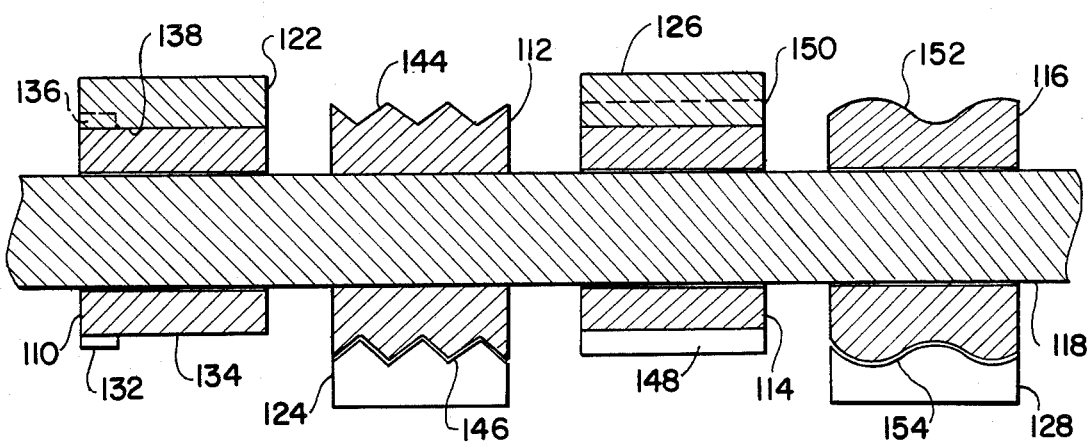

Although the bearing surfaces 58, 60 have a compound/complex shape (i.e., a combination of straight and curved) and the bearing members 52, 54 are round (i.e., in the form of rollers), other bearing surfaces and member configurations can be employed. Such other bearing surface and member configurations are illustrated in FIGS. 3a and 3b. and 5b. Unless otherwise indicated, the embodiments of FIGS. 3a and 3b operate in the same manner as the embodiment of FIGS. 1 and 2.

Referring now to FIGS. 3a and 3b, split bearings members 110, 112, 114, 116 are rotatably mounted on a crankpin 118 for reciprocating linear movement in a direction indicated by arrow 120. The bearing members 110, 112, 114, 116 are in constant engagement with bearing surfaces, respectively, formed integrally with a common shuttle (not shown) adapted for reciprocating linear movement in a direction indicated by arrow 130.

The bearing member 110 is provided with gear teeth 132 at one end of the bearing member 110. A smooth circumferential surface 134 extrends from the gear teeth 132 to an opposite end of the bearing member 110. The gear teeth 132 mesh with gear teeth 136 provided on the bearing surface 122. As the shuttle reciprocates linearly in the direction indicated by the arrow 130 and the bearing member 110 moves back and forth along the bearing surface 122 in the direction indicated by the arrow 120, the smooth circumferential surface 134 of the bearing member 110 rolls along a flat portion 138 of the bearing surface 122. During such movement of the bearing member 110, the gear teeth 132 on the bearing member 110 cooperate with the gear teeth 136 on the bearing surface 122 to prevent either of two splits 140, 142 in the bearing member 110 from coming into contact with the bearing surface 122, whereby the direct application of pressure on the splits 140, 142 is avoided.

The bearing member 112 is provided with sawtooth-shaped, circumferential grooves 144 which mesh with complementary-shaped, circumferential grooves 146 provided on the bearing surface 124. As the shuttle reciprocates linearly in the direction indicated by the arrow 130 and the bearing member 112 moves back and forth along the bearing surface 124 in the direction indicated by the arrow 120, the grooves 144 on the bearing member 112 cooperate with the grooves 146 on the bearing surface 124 to maintain the proper alignment of the shuttle, thereby reducing friction and piston sideload. The grooves 144, 146 also cooperate to increase the contact area between the bearing member 112 and the bearing surface 124, thereby increasing load-carrying capability.

The bearing member 114 is provided with gear teeth 148 which mesh with gear teeth 150 provided on the bearing surface 126. As the shuttle reciprocates linearly in the direction indicated by the arrow 130 and the bearing member 114 moves back and forth along the bearing surface 126 in the direction indicated by the arrow 120, the gear teeth 148 on the bearing member 114 cooperate with the gear teeth 150 on the bearing surface 126 to prevent either of two splits (not shown) in the bearing member 114 from coming into contact with the bearing surface 112, whereby the direct application of pressure on the splits is avoided. The gear teeth 148, 150 also cooperate to maintain the proper alignment of the shuttle, thereby reducing friction and piston sideload, and to increase the contact area between the bearing member 114 and the bearing surface 126, thereby increasing load-carrying capability. Although the bearing member 114 is in the form of a spur gear, it could, alternatively, be in the form of a helical gear or a bevel gear. If such an alternate form of the bearing member 114 is employed, corresponding changes would, of course, be made in the bearing surface 126.

The bearing member 126 is provided with sinusoidal-shaped, circumferential grooves 152 which mesh with complementary-shaped, circumferential grooves 154 provided on the bearing surface 128. As the shuttle reciprocates linearly in the direction indicated by the arrow 130 and the bearing member 116 moves back and forth along the bearing surface 128 in the direction indicated by the arrow 120, the grooves 152 on the bearing member 116 cooperate with the grooves 154 on the bearing surface 128 to maintain the proper alignment of the shuttle, thereby reducing friction and piston sideload, and to increase the contact area between the bearing member 116 and the bearing surface 128, thereby increasing load-carrying capability.

It will be understood that the embodiments described herein are merely exemplary and that a person skilled in the art may make many variations and modifications without departing from the spirit and scope of the invention. For instance, the shuttle 16 can have a plurality of pistons at one end and a single piston at its opposite end. Moreover, each end of the shuttle 16 can be provided with more than two pistons, the pistons having the same sizes and shapes or different sizes and shapes. All such modifications and variations are intended to be included within the scope of the invention as defined in the appended claims.

I claim:

1. A device for directly converting rectilinear motion to rotary motion or vice versa, comprising a rotatable crank, having a crankpin and at least two bearing members rotatably mounted alongside each other on said crankpin, and a shuttle mounted for reciprocating rectilinear movement, said shuttle including an opening extending therethrough from one side of said shuttle to an opposite side of said shuttle, said opening being sized and shaped such that said crankpin extends therethrough, and at least two bearing surfaces fixedly attached to said shuttle such that said bearing surfaces are rectilinearly and reciprocally movable conjointly with said shuttle, one of said bearing surfaces having a first end and a second end and being located adjacent one end of and to one side of said opening such that said one bearing surface is in constant engagement with one of said bearing members as said one bearing member moves back and forth along said one bearing surface and said one bearing surface only between said first and second ends thereof, said one bearing member rotating in one arcuate direction as it moves between said first and second ends of said one bearing surface in a first direction and in an opposite arcuate direction as it moves between said first and second ends of said one bearing surface in a second direction opposite to said first direction, and another of said bearing surfaces having a first end and a second end and being located adjacent an opposite end of and to an opposite side of said opening such that said another bearing surface is offset relative to said one bearing surface and is in constant engagement with another of said bearing members as said another bearing member moves back and forth along said another bearing surface and said another bearing surface only between said first and second ends thereof, said another bearing member rotating in said opposite arcuate direction as it moves between said first and second ends of said another bearing surface in said first direction and in said one arcuate direction as it moves between said first and second ends of said another bearing surface in said second direction, whereby the reciprocating rectilinear motion of said shuttle is continuously converted into the rotary motion of said crank or vice versa.

2. The device of claim 1, wherein said bearing surfaces are offset relative to each other in a direction which is parallel to a longitudinal axis of said crankpin.

3. The device of claim 1, wherein said one bearing surface is located solely on said one side of said crankpin and wherein said another bearing surface is located solely on said opposite side of said crankpin.

4. The device of claim 3, wherein said one bearing member is unrestricted on said opposite side of said crankpin and wherein said another bearing member is unrestricted on said one side of said crankpin.

5. The device of claim 1, further comprising guiding means for guiding said shuttle during its reciprocating rectilinear movement.

6. The device of claim 5, wherein said guiding means includes at least one cylinder and at least one piston mounted for reciprocating linear movement in said at least one cylinder.

7. The device of claim 6, wherein said guiding means includes a plurality of cylinders and a plurality of pistons, each piston being mounted for reciprocating linear movement in a corresponding one of said cylinders.

8. The device of claim 6, wherein each piston is formed integrally with said shuttle.

9. The device of claim 6, further comprising fastening means for removably fastening each piston to said shuttle.

10. The device of claim 9, wherein each piston includes a face and wherein said fastening means includes screws threadedly received in holes provided in said face of each piston and extending into said shuttle.

11. The device of claim 1, wherein said bearing members are removably mounted on said crankpin, whereby said bearing members can be removed and replaced.

12. The device of claim 11, wherein said bearing surfaces are removably attached to said shuttle, whereby said bearing surfaces can be removed and replaced.

13. The device of claim 12, wherein said one bearing member and said one bearing surface form a first interchangeable set and wherein said another bearing member and said another bearing surface form a second interchangeable set, whereby the linear speed of said shuttle relative to the angular speed of said crank can be varied by changing said first and second sets.

14. The device of claim 1, wherein said bearing members are rollers.

15. The device of claim 1, wherein said bearing surfaces have a combination straight and curved shape.

16. The device of claim 1, wherein said bearing surfaces are arranged at right angles relative to the rectilinearly motion of said shuttle, whereby said bearing members reciprocate rectilinearly along said bearing surfaces in a direction which is perpendicular to the rectilinearly movement of said shuttle.

17. The device of claim 1, wherein said bearing surfaces are arranged at similar inclined angles relative to the linear movement of said shuttle, whereby said bearing members reciprocate linearly along said bearing surfaces in a direction which is at an inclined angle relative to the linear movement of said shuttle.

18. The device of claim 1, wherein said bearing surfaces have an arcuate shape.

19. The device of claim 1, wherein said one of said bearing members includes a first set of gear teeth and said one of said bearing surfaces includes a second set of gear teeth which meshes with said first set of gear teeth.

20. The device of claim 19, wherein said first set of gear teeth extends across only a portion of said one bearing member.

21. The device of claim 20, wherein said one bearing member includes a smooth circumferential surface.

22. The device of claim 21, wherein said second set of gear teeth extends across only a portion of said one bearing surface.

23. The device of claim 22, wherein said one bearing surface includes a smooth surface which engages said smooth circumferential surface of said one bearing member.

24. The device of claim 1, wherein said one bearing member includes a plurality of circumferential grooves and said one bearing surface includes a plurality of complementary-shaped circumferential grooves.

25. The device of claim 24, wherein said grooves have a sawtooth cross-sectional shape.

26. The device of claim 24, wherein said grooves have a sinusoidal cross-sectional shape.

27. The device of claim 1, wherein said crank includes a crankshaft and a crankarm connected to said crankshaft and said crankpin such that said crankshaft and said crankpin are offset relative to each other.

28. The device of claim 1, wherein said one bearing surface and said another bearing surface are fixedly positioned relative to each other.

29. The device of claim 1, wherein said crankpin and hence said bearing members travel in a complete circular path as said shuttle reciprocates rectilinearly.

* * * * *

UNITED STATES PATENT AND TRADEMARK OFFICE
CERTIFICATE OF CORRECTION

PATENT NO. : 4,685,342
DATED : August 11, 1987
INVENTOR(S) : Douglas C. Brackett It is certified that error appears in the above-indentified patent and that said Letters Patent is hereby corrected as shown below:

```
     Column 2, line 13, delete "fastend" and insert
--fastened--.
            line 31, delete "poriton" and insert --portion--.
            line 43, delete "." and insert --,--.
     Column 3, line 5, delete "53" and insert --52--.
            line 51, delete "surfaces" and insert
--surface--.
            line 63, after "surfaces", insert --122, 124,
126, 128--.
```
In the Claims

```
Column 17, line 47, delete "linear" and insert
--rectilinear--.
            line 48, delete "linearly" and insert
--rectilinearly--.
            line 50, delete "linear" and insert
--rectilinear--.
```

Signed and Sealed this

Twenty-fourth Day of May, 1994

*Attest:*

BRUCE LEHMAN

*Attesting Officer*        *Commissioner of Patents and Trademarks*